(12) United States Patent
Kim et al.

(10) Patent No.: US 10,063,150 B2
(45) Date of Patent: Aug. 28, 2018

(54) METHOD AND SYSTEM OF CONTROLLING CONVERTER

(71) Applicant: Hyundai Motor Company, Seoul (KR)

(72) Inventors: Jee Heon Kim, Gyeonggi-do (KR);
Jun Yeon Park, Gyeonggi-do (KR);
Hyun Wook Seong, Gyeonggi-do (KR);
Won Kyoung Choi, Gyeonggi-do (KR);
Dong Jun Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/137,156

(22) Filed: Apr. 25, 2016

(65) Prior Publication Data

US 2017/0155329 A1 Jun. 1, 2017

(30) Foreign Application Priority Data

Nov. 26, 2015 (KR) ........................ 10-2015-0166474

(51) Int. Cl.
*H02M 3/335* (2006.01)
*H02M 1/08* (2006.01)
*H02M 1/32* (2007.01)

(52) U.S. Cl.
CPC ......... *H02M 3/33507* (2013.01); *H02M 1/08* (2013.01); *H02M 1/32* (2013.01); *H02M 3/33584* (2013.01)

(58) Field of Classification Search
CPC ............. H02M 3/335; H02M 3/33569; H02M 3/33507; H02M 3/33538; H02M 3/33523; H02M 3/33515; H02M 3/33592; H02M 3/33576; H02M 3/33561; H02M 3/33546; H02M 3/156; H02M 3/3372; H02M 3/3378; H02M 3/337; H02M 3/3376; H02M 3/28; H02M 3/3384; H02M 3/157; H02M 3/1584; H02M 2001/0032; H02M 2001/0025; H02M 2001/346; H02M 7/53806;

(Continued)

(56) References Cited

U.S. PATENT DOCUMENTS

2009/0091300 A1* 4/2009 Radke ................... H02J 7/0081
320/163
2010/0038969 A1* 2/2010 Hu .......................... H02P 9/102
307/84

(Continued)

FOREIGN PATENT DOCUMENTS

JP    2006-101636 A    4/2006
JP    2015-070750 A    4/2015

(Continued)

*Primary Examiner* — Nguyen Tran
*Assistant Examiner* — Kevin H Sprenger
(74) *Attorney, Agent, or Firm* — Mintz Levin Cohn Ferris Glovsky and Popeo, P.C.; Peter F. Corless

(57) ABSTRACT

A method and system of controlling a converter is provided. The method includes sensing, by a controller, an on and off state of a secondary side switch of the converter and deriving, by the controller, a current command of the converter. The current command is then compared with preset current reference values each provided based on the on and off state of the secondary side switch. As the result of the comparison of the current command with the current reference value, the on and off state of the secondary side switch is either changed or maintained.

15 Claims, 2 Drawing Sheets

(58) Field of Classification Search
CPC .......... H02M 7/48; H02M 7/51; H02M 7/538;
H02M 7/5387; H02M 7/003; H02M
7/53871; H02M 7/53875; H02M 7/53803;
H02M 7/537; H02M 7/53835; H02M
7/5381; H02M 7/53846; H02M 7/066;
H02M 7/493; H02M 7/7575; H02M
7/525; H02M 7/219; H02M 7/217; Y02B
70/1433; Y02B 70/126
USPC ...... 363/15–16, 24–26, 56.06–56.08, 76–81,
363/125–127, 131–134
See application file for complete search history.

(56) References Cited

U.S. PATENT DOCUMENTS

| | | | | |
|---|---|---|---|---|
| 2012/0113687 | A1* | 5/2012 | Wildrick | H02M 3/3378 363/21.02 |
| 2014/0334202 | A1* | 11/2014 | Cameron | H02J 5/00 363/56.01 |
| 2015/0222191 | A1* | 8/2015 | Hosoda | H02M 3/285 363/21.01 |
| 2016/0126844 | A1* | 5/2016 | Tschirhart | H02M 3/33592 363/17 |

FOREIGN PATENT DOCUMENTS

| | | |
|---|---|---|
| KR | 2011-0072013 A | 6/2011 |
| KR | 10-1519758 B1 | 5/2015 |

\* cited by examiner

METHOD AND SYSTEM OF CONTROLLING CONVERTER

CROSS REFERENCE TO RELATED APPLICATION

This application claims the benefit of Korean Patent Application No. 10-2015-0166474, filed on Nov. 26, 2015, which is hereby incorporated by reference in its entirety into this application.

BACKGROUND

1. Technical Field

The present invention relates to a bi-directional converter, and more particularly, to a method and a system of controlling a converter to prevent reverse powering occurring when a load of an output terminal of a converter is a low load.

2. Description of the Related Art

Recently, eco-friendly vehicles have been developed including hybrid vehicles that use both of the existing internal combustion engine and a battery as a power source. The hybrid vehicles may be driven by an electric motor upon starting and by the electric motor and an internal combustion engine upon driving the vehicle. In the typical driving system of the hybrid vehicles, an input side of a power converter is connected to a large-capacity high voltage battery and an output side thereof is connected to a motor or an auxiliary battery.

A DC-DC converter configured to convert a voltage for charging the auxiliary battery as a medium for power transfer is disposed between the high voltage battery and the auxiliary battery, often known as a low voltage DC-DC (LDC) converter. An LDC using a diode device and an LDC using switch devices (transistor, MOSFET, etc.) have been used as LDC's in the related art. Recently, the converter using the switch device may be boosted and bucked bi-directionally. The bi-directional converter using the switch device has different converter efficiency based on an on/off control of the switch device. Therefore, a method in the related art decreases an operation period of a switch device to increase an operation frequency of a transformer when an output capacity of a bi-directional converter is increased and increases the operation period of the switch device to decrease the operation frequency of the transformer when the output capacity thereof is decreased, thereby optimizing efficiency of the converter for a buck mode and a boost mode, respectively, while using one transformer. However, even by the above-mentioned method, the converter may still have the reduced efficiency and durability due to a reverse current flowing from the auxiliary battery to the high voltage battery side which may be generated by replacing the diode of the converter by the switch device.

The matters described as the related art have been provided merely for assisting in the understanding for the background of the present invention and should not be considered as corresponding to the related art known to those skilled in the art.

SUMMARY

The present invention provides a method and a system of controlling a converter using a switch device to improve efficiency of the converter and durability of devices in the converter by preventing reverse powering from occurring when a load of an output terminal of the converter is a low load.

According to an exemplary embodiment of the present invention a method of controlling a converter may include: sensing, by a controller, an on/off state of a secondary side switch of the converter disposed therein; deriving, by the controller, a current command of the converter; comparing, by the controller, the current command with preset current reference values each provided based on the on/off state of the secondary side switch; and based on the comparison of the current command and the current reference value, changing or maintaining the on/off state of the secondary side switch.

The derivation of the current command may include: sensing, by the controller, an output voltage of the converter; deriving, by the controller, a voltage difference value between the output voltage and an output voltage command of the converter; and applying, by the controller, the voltage difference value to a voltage controller to derive the current command of the converter. The voltage controller may be an integral controller. In the changing or maintaining, when the secondary side switch of the converter is in an on state and the derived current command of the converter is less than a preset on current reference value, the controller may be configured to change the on state of the secondary side switch to an off state. In addition, in the changing or maintaining, when the secondary side switch of the converter is in an on state and the derived current command of the converter is equal to or greater than a preset on current reference value, the controller may be configured to maintain the on state of the secondary side switch.

Furthermore, in the changing or maintaining, when the secondary side switch of the converter is in an off state and the derived current command of the converter is less than a preset off current reference value, the controller may be configured to maintain the off state of the secondary side switch to the on state. In addition, when the secondary side switch of the converter is in an off state and the derived current command of the converter is equal to or greater than a preset off current reference value, the controller may be configured to change the off state of the secondary side switch. The on current reference value may be derived by a map data using the load of the converter as an input and the on current reference value as an output. The off current reference value may be derived by a map data using the load of the converter as an input and the off current reference value as an output.

According to another exemplary embodiment of the present invention a system of controlling a converter may include: a converter configured to convert a voltage bi-directionally based on a control of a switch device disposed therein; a sensor configured to sense an output voltage of the converter; and a controller configured to receive the output voltage from the sensor to derive a difference value from an output voltage command of the converter, apply the difference value to a voltage controller to derive a current command of the converter, compare the current command with preset current reference values each provided based on an on/off state of a secondary side switch of the converter, and as the result of the comparison of the current command and the current reference value, change or maintain the on/off state of the secondary side switch.

BRIEF DESCRIPTION OF THE DRAWINGS

The above and other features of the present invention will now be described in detail with reference to exemplary embodiments thereof illustrated in the accompanying drawings which are given hereinbelow by way of illustration only, and thus are not limitative of the present invention, and wherein.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, exemplary embodiments of the present invention will be described with reference to the accompanying drawings.

Figure 1:
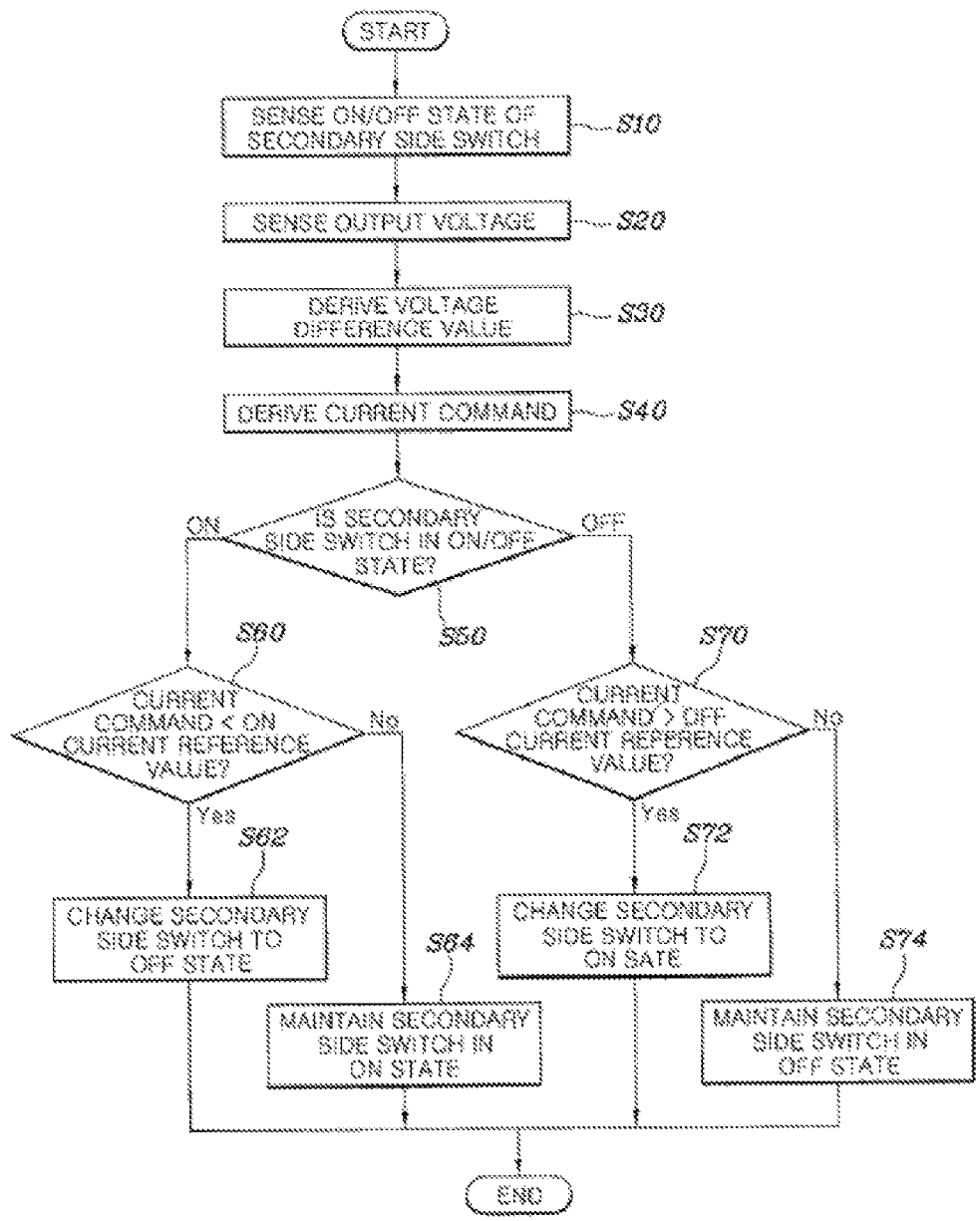
FIG. 1 is a flow chart of a method of controlling a converter according to an exemplary embodiment of the present invention.

As illustrated in FIG. 1, a method of controlling a converter 10 according to an exemplary embodiment of the present invention may include: sensing, by a controller 30, an on/off state of a secondary side switch 40 of the converter 10 (S10) using a sensor; sensing, by the controller 30, an output voltage of the converter 10 (S20) using a sensor; deriving, by the controller 30, a voltage difference value between the output current command of the converter 10 and the output voltage (S30); applying, by the controller 30, the voltage difference value to a voltage controller to derive the current command of the converter 10 (S40); comparing, by the controller 30, the current command with preset current reference values each provided based on the on/off state of the secondary side switch 40 (S50); and as the result of the comparison, by the controller, of the current command with the current reference value, changing or maintaining the on/off state of the secondary side switch 40.

Figure 2:
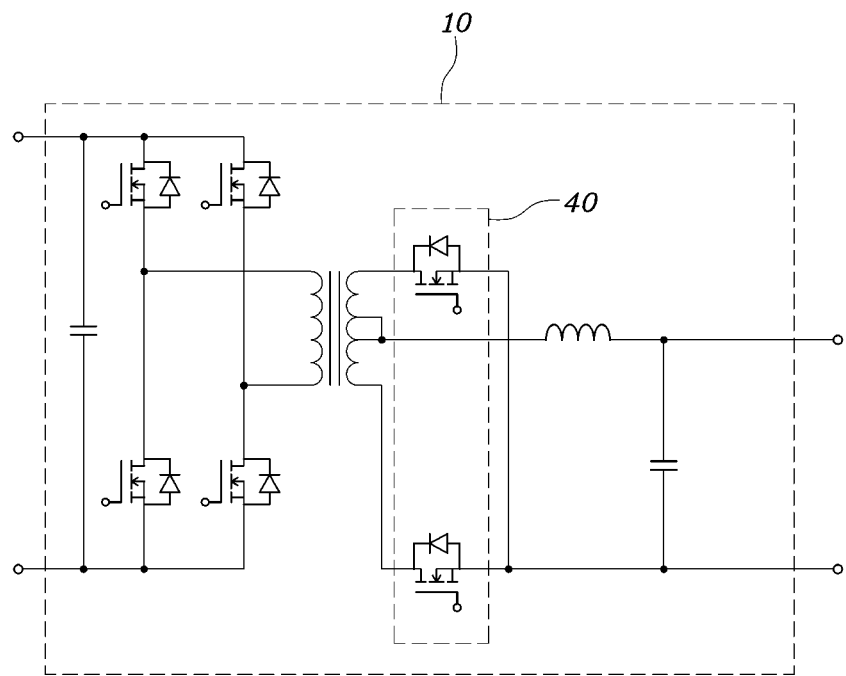
FIG. 2 is an internal configuration diagram of the converter according to the exemplary embodiment of the present invention.
Figure 3:
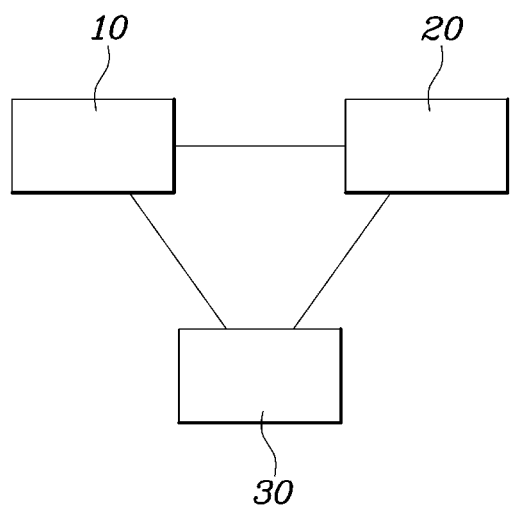
FIG. 3 is a configuration diagram of a converter system according to an exemplary embodiment of the present invention.

Prior to describing the control method according to the exemplary embodiment of the present invention, an internal configuration diagram of the converter 10 illustrated in FIG. 2 will be described. Referring to FIG. 2, a transformer may be formed in a full bridge form and thus may be divided into a primary side configured to receive input power and a secondary side configured to output a voltage converted by the transformer. In the converter 10, rectifier circuits disposed at the primary side and the secondary side may include a diode or a switch device. Recently, a switch device configured to minimize a power loss of the converter 10 by a control has been mainly used. Accordingly, in the converter 10 according to the exemplary embodiment of the present invention, the rectifier circuits at the primary side and the secondary side may use the switch device, and in particular, as illustrated in FIG. 2, the rectifier circuit may be configured of a MOSFET device.

Accordingly, referring to a flow chart illustrated in FIG. 1 with reference to an internal configuration of the converter 10 of FIG. 2, in the sensing of the on/off state of the secondary side switch 40 (S10), the secondary side switch 40 may indicate two switch devices disposed in the rectifier circuit at the secondary side of the converter 10 of FIG. 2. In particular, the sensing of the on/off state of the secondary side switch 40 of the converter 10 may be executed when the secondary side switch 40 is in an on state, and reverse powering of the converter 10 may occur.

Particularly, the reverse powering may indicate a state in which a reverse current flows from an output terminal of the converter 10 toward an input terminal The existing converter 10 using a diode may not lead to the problem of the reverse powering since the diode prevents a reverse current. According to the exemplary embodiment of the present invention, in the converter 10 using the switch device, the switch device may not block the reverse current and therefore the problem of the reverse powering may occur. Therefore, in the prevention of the reverse powering, the on/off state of the secondary side switch 40 may be sensed. When the secondary side switch 40 is in an off state, the possibility that the current flows from the output terminal of the converter 10 toward the input terminal may be minimal and therefore the on/off of the secondary side switch 40 of the converter 10 has been suggested as a determination criterion on absence or presence of the reverse powering.

After the sensing of the on/off state of the secondary side switch 40 (S10), the current command of the converter 10 may be derived. The current command of the converter 10 may be derived to perform the on/off control of the secondary side switch 40. Additionally, when a reverse current generated in the converter 10 is infrequent and when the reverse current is not generated, the secondary side switch 40 may be turned on to improve the efficiency of the converter 10. Accordingly, the control criterion for the control is required, and therefore the present invention provides the current command as the control criterion.

Unlike the control (e.g., control using the output voltage or the output current of the converter 10) of the general converter 10 in the related art, using the current command in the present invention is more efficient than the existing technologies using the output voltage or the output current. In particular, when using the output current according to the related art, a bi-directional current sensor is required and therefore costs of the converter may be increased, and a sensor is added and therefore a delay and an offset may occur. Further, when using the output voltage, the output voltage and a voltage of an auxiliary battery are equal during the driving of the converter 10 and therefore although information regarding the output voltage is considered, the reverse powering of the converter 10 may not be sensed.

Therefore, as a method of sensing reverse power without a separate sensor, a method is provided of using a current command of a converter 10 according to the exemplary embodiment of the present invention. The method of deriving a current command is illustrated in FIG. 1.

A derivation of the current command may include sensing the output voltage of the converter 10 (S20). As described above, the output voltage of the converter 10 may be equal to the voltage of the auxiliary battery connected to the output terminal of the converter 10 during the driving of the converter 10 and therefore it may be possible to more easily sense the output voltage of the converter 10 using the same. After sensing the output voltage of the converter 10, the controller 30 may be configured to derive a voltage difference value between the output voltage and the output voltage command of the converter (S30). In particular, the output voltage command may be the output voltage of the converter 10 targeted by a user (e.g., user intention) and may be considered as the output voltage of the converter in an ideal state. Further, the voltage difference value may be derived to thus derive the current command of the converter 10 by the adjustment to minimize the voltage difference in the present invention.

Therefore, after the derivation of the voltage difference value (S30), the controller 30 may be configured to apply the voltage difference value to the voltage controller to derive the current command of the converter 10 (S40). In particular, the voltage controller may be configured to minimize the voltage difference value to adjust the output voltage command of the converter 10 to be equal to the actual output voltage. The voltage controller may be an integral controller.

When the current command that is the control criterion in the present invention is derived by the above-mentioned process, the controller 30 may be configured to compare, the current command and the preset current reference values each provided based on the on/off state of the secondary side switch 40 (S50) and as a result of comparing the current command and the current reference value, the controller 30 may be configured to change or maintain the on/off state of the secondary side switch 40. In particular, when the secondary side switch 40 of the converter 10 is in the on state and the derived current command of the converter 10 is less than the preset on current reference value, the controller 30 may be configured to change the on state of the secondary side switch 40 to the off state (S62). The on current reference value may indicate the current command value in the state in which the reverse powering may occur when the secondary side switch 40 is in the on state.

Therefore, the on current reference value may be derived by various methods. Generally, the values may vary based on the load of the output terminal of the converter 10 and therefore the load value of the output terminal may be considered in the setting of the on current reference value. Accordingly, for the method of deriving an on current reference value according to the present invention, a method is provided of using a map data using the load of the converter 10 as an input and the on current reference value as an output. The on current reference value derived by the method may be stored in the controller 30 or may also be stored in a memory unit provided separately from the controller.

In the comparison of the on current reference value derived by the above-mentioned method with the current command, when the current command is less than the on current reference value, the reverse powering may occur and therefore the controller 30 may be configured to turn off the secondary side switch 40 to block the reverse current due to the reverse powering. Further, when the secondary side switch 40 of the converter 10 is in the on state and the derived current command of the converter 10 is equal to or greater than the preset on current reference value, unlike the foregoing case, the reverse powering may be less likely to occur. In particular, the secondary side switch 40 may be maintained in the on state (S64) to prevent the efficiency of the converter 10 from decreasing.

The control method when the secondary side switch 40 is in the off state is similar to the foregoing method. When the secondary side switch 40 of the converter 10 is in the off state and the derived current command of the converter 10 is less than the preset off current reference value, the controller 30 may be configured to change the off state of the secondary side switch 40 to the on state (S72) and when the secondary side switch 40 of the converter 10 is in the off state and the derived current command of the converter 10 is equal to or greater than the preset off current reference value, the controller 30 may be configured to maintain the off state of the secondary side switch 40 (S74). Particularly, the off current reference value may also be derived by the map data using the load of the converter 10 as the input and the off current reference value as the output. The map may be pre-stored using the input and outputs and stored in the memory of the controller. When the current command is less than the off current reference value, since the reverse powering may be unlikely to occur, the secondary side switch 40 may be turned on to improve the efficiency of the converter 10 and when the current command is equal to or greater than the off current reference value, since the reverse powering may be likely to occur, the off state of the secondary side switch 40 may be maintained.

In addition, a system of controlling a converter 10 according to the exemplary embodiment of the present invention may include: a converter 10 configured to convert a voltage bi-directionally based on a control of a switch device disposed therein; a sensor 20 configured to sense an output voltage of the converter 10; and a controller 30 configured to receive the output voltage from the sensor 20 to derive a difference value from an output voltage command of the converter 10, apply the difference value to a voltage controller to derive the current command of the converter 10, compare the current command with preset current reference values each provided based on an on/off state of a secondary side switch 40 of the converter 10, and as the result of comparing the current command with the current reference value, change or maintain the on/off state of the secondary side switch 40.

As described above, the present invention may obtain the following effects.

First, the energy efficiency of the converter may be improved and the devices in the converter may be prevented from being damaged by blocking the reverse powering current which may be generated upon the low load of the converter.

Second, the control may be performed using the current command of the converter and therefore the additional sensor may not be separately required, thereby saving costs.

Although the present invention has been shown and described with respect to exemplary embodiments, it will be obvious to those skilled in the art that the present invention may be variously modified and altered without departing from the spirit and scope of the present invention as defined by the following claims.

What is claimed is:

1. A method of controlling a converter, comprising:
sensing, by a controller, an on and off state of a secondary side switch of the converter;
deriving, by the controller, a current command of the converter;
comparing, by the controller, the current command with preset current reference values each provided based on the on and off state of the secondary side switch; and
as the result of the comparison of the current command with the current reference value, changing or maintaining, by the controller, the on and off state of the secondary side switch,
wherein when the secondary side switch of the converter is in an on state and the derived current command of the converter is less than a preset on current reference value, the controller is configured to change the on state of the secondary side switch to the off state to block the reverse current due to reverse powering, and
wherein the deriving of the current command includes:
sensing, by the controller, an output voltage of the converter;
determining, by the controller, a voltage difference value between the output voltage and an output voltage command of the converter; and
applying, by the controller, the voltage difference value to a voltage controller to derive the current command of the converter.

2. The method of claim 1, wherein the voltage controller is an integral controller.

3. The method of claim 1, wherein when the secondary side switch of the converter is in an on state and the derived current command of the converter is equal to or greater than a preset on current reference value, the controller is configured to maintain the on state of the secondary side switch.

4. The method of claim 1, wherein when the secondary side switch of the converter is in an off state and the derived current command of the converter is less than a preset off current reference value, the controller is configured to maintain the off state of the secondary side switch.

5. The method of claim 1, wherein when the secondary side switch of the converter is in an off state and the derived current command of the converter is equal to or greater than a preset off current reference value, the controller is configured to change the off state of the secondary side switch to the on state.

6. The method of claim 1, wherein the on current reference value is derived by a map data using the load of the converter as an input and the on current reference value as an output.

7. The method of claim 3, wherein the on current reference value is derived by a map data using the load of the converter as an input and the on current reference value as an output.

8. The method of claim 4, wherein the off current reference value is derived by a map data using the load of the converter as an input and the off current reference value as an output.

9. The method of claim 5, wherein the off current reference value is derived by a map data using the load of the converter as an input and the off current reference value as an output.

10. A system of controlling a converter, comprising:
a converter configured to convert a voltage bi-directionally based a control of a switch device disposed therein;
a sensor configured to sense an output voltage of the converter; and
a controller configured to:
receive the output voltage from the sensor to derive a difference value from an output voltage command of the converter;
apply the difference value to a voltage controller to derive a current command of the converter;
compare the current command with preset current reference values each provided based on an on and off state of a secondary side switch of the converter; and
in response to comparing the current command with the current reference value, change or maintain the on and off state of the secondary side switch,
wherein when the secondary side switch of the converter is in an on state and the derived current command of the converter is less than a preset on current reference value, the controller is configured to change the on state of the secondary side switch to the off state to block the reverse current due to the reverse powering, and
wherein in the derivation of the current command the controller is further configured to:
sense an output voltage of the converter;
determine a voltage difference value between the output voltage and an output voltage command of the converter; and
apply the voltage difference value to a voltage controller to derive the current command of the converter.

11. The system of claim 10, wherein the voltage controller is an integral controller.

12. The system of claim 10, wherein when the secondary side switch of the converter is in an on state and the derived current command of the converter is equal to or greater than a preset on current reference value, the controller is configured to maintain the on state of the secondary side switch.

13. The system of claim 10, wherein when the secondary side switch of the converter is in an off state and the derived current command of the converter is less than a preset off current reference value, the controller is configured to maintain the off state of the secondary side switch.

14. The system of claim 10, wherein when the secondary side switch of the converter is in an off state and the derived current command of the converter is equal to or greater than a preset off current reference value, the controller is configured to change the off state of the secondary side switch to the on state.

15. A non-transitory computer readable medium containing program instructions executed by a controller, the computer readable medium comprising:
program instructions that control a sensor to detect an on and off state of a secondary side switch of a converter;

program instructions that derive a current command of the converter;

program instructions that compare the current command with preset current reference values each provided based on the on and off state of the secondary side switch; and program instructions that change or maintain the on and off state of the secondary side switch as the result of the comparison of the current command with the current reference value, wherein when the secondary side switch of the converter is in an on state and the derived current command of the converter is less than a preset on current reference value, the program instructions change the on state of the secondary side switch to the off state to block the reverse current due to reverse powering, and wherein in the derivation of the current command the program instructions further:

sense an output voltage of the converter;

determine a voltage difference value between the output voltage and an output voltage command of the converter; and apply the voltage difference value to a voltage controller to derive the current command of the converter.

* * * * *